J. KELLINGTON.
FISH GUTTING AND CLEANING MACHINE.
APPLICATION FILED APR. 27, 1922.
1,430,816.
Patented Oct. 3, 1922.
3 SHEETS—SHEET 2.
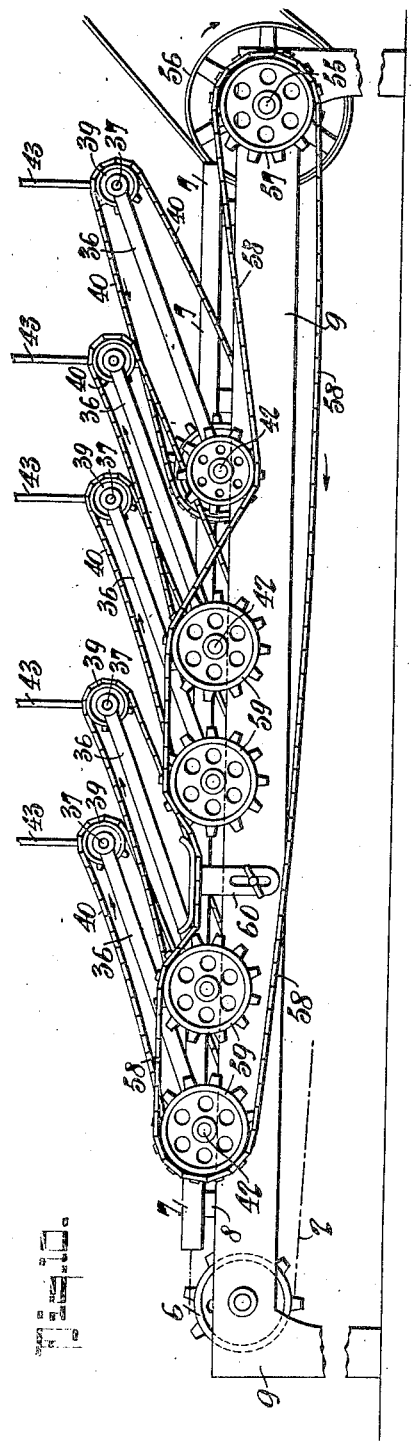
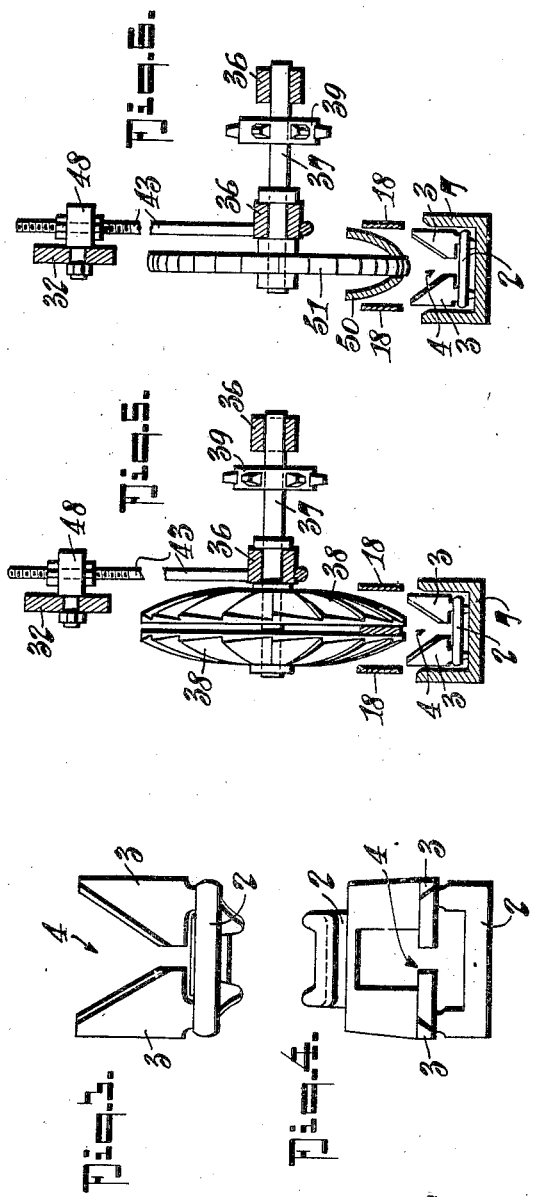
Inventor
John Kellington.
By Fred G Dieterich & Co
Attorneys J. KELLINGTON.
FISH GUTTING AND CLEANING MACHINE.
APPLICATION FILED APR. 27, 1922.
1,430,816.
Patented Oct. 3, 1922.
3 SHEETS—SHEET 3.
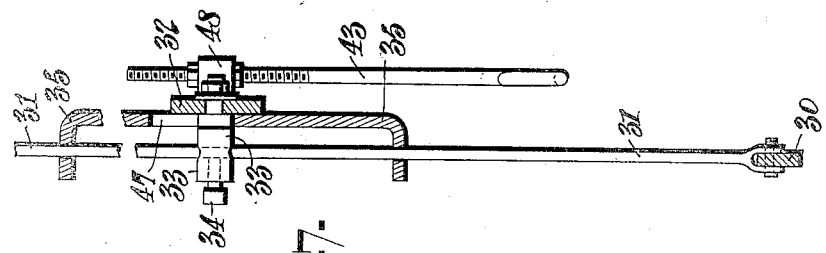
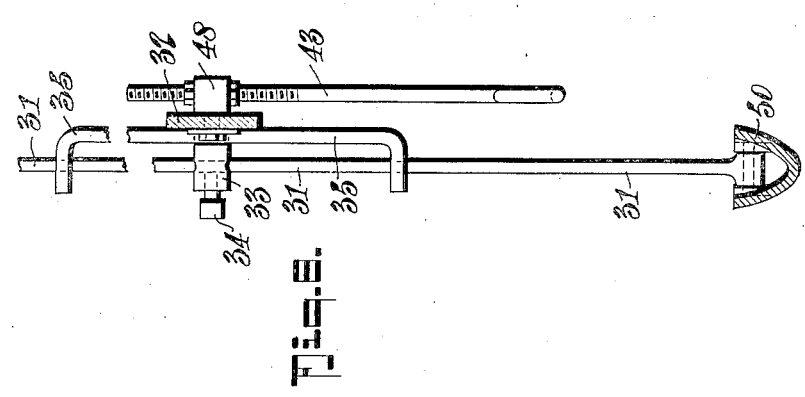
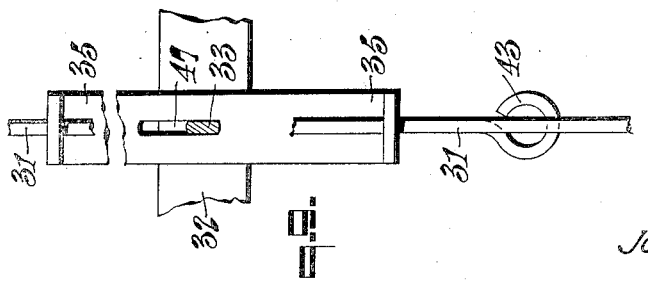
Inventor
John Kellington.
By Fred G. Dieterich & Co
Attorneys Patented Oct. 3, 1922.

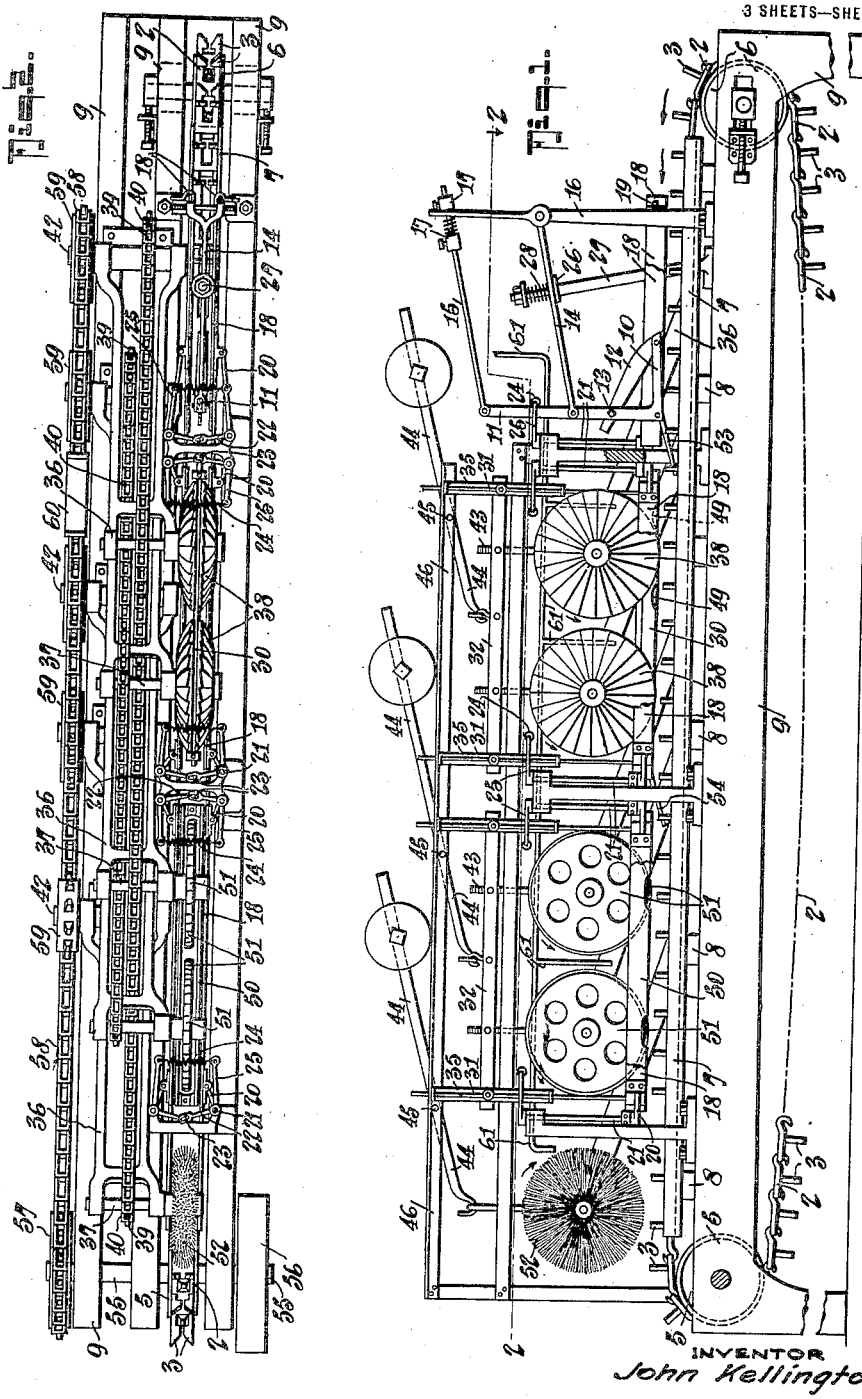

1,430,816

UNITED STATES PATENT OFFICE.

JOHN KELLINGTON, OF VANCOUVER, BRITISH COLUMBIA, CANADA.

FISH GUTTING AND CLEANING MACHINE.

Application filed April 27, 1922. Serial No. 556,886.

*To all whom it may concern:*

Be it known that I, JOHN KELLINGTON, citizen of the Dominion of Canada, residing at Vancouver, in the Province of British Columbia, Canada, have invented certain new and useful Improvements in Fish Gutting and Cleaning Machines, of which the following is a specification.

This invention relates to a machine for splitting, gutting, scraping and cleaning fish in preparation of the same for canning. In this machine the fish, after having their heads, tails and fins cut off, are deposited head end first, and bellies up on an endless conveyor chain of particular construction and on it pass successively through four distinct operations.

In the first operation the fish are split along the belly from within the visceral cavity with a stationary knife supported in a particular manner to attain the desired result.

In the next stage, the split fish are passed under two pair of revolving gutting wheels, counterbalanced to rest with the required pressure on the fish, by which wheels the viscera are removed.

The chain then carries the fish under two revolving wheels that scrape the backbone throughout the visceral cavity.

Thereafter the fish pass under a rapidly revolving brush by which the inside of the fish is finally cleaned.

During all these operations water is plentifully supplied.

The invention is fully described in the following specification, reference being made to the drawings by which it is accompanied, in which:

Fig. 1 is a front elevation of the machine, portions of the fish supporting strips being removed adjacent the entering end to reveal parts between the strips.

Fig. 2 is a plan of the same on the line 2—2 in Fig. 1.

Figs. 3 and 4 show, in end elevation and plan, a link of the fish carrying chain to an enlarged scale.

Fig. 5 is a detail to an enlarged scale of the fish gutting wheels and their related parts.

Fig. 6 is a similar view of the wheel by which the visceral cavity is scraped along the backbone.

Fig. 7 is an enlarged detail of the means by which each end of the medial bar and the gutting wheels are connected to rise and fall together.

Fig. 8 is a similar view of the connection between the mould bar and its scraping wheel.

Fig. 9 is a face view of either of the foregoing details, a portion being removed to show the provision for endwise movement of the connection in the guide frame.

Fig. 10 is an elevation of the back of the machine showing the means for driving the several mechanisms.

The endless chain by which the fish are carried through the machine and on which it is supported during the several operations referred to, consists of an ordinary sprocket chain 2 having an upward projection 3 from each link, in the middle of which projection a V-shaped notch 4 is cut. The edges of the notch are bevelled slightly outward backward, as shown in Fig. 4, so that the angular edges of the notches may have an effective hold of the fish to carry it through the several operations.

This endless chain 2, 3 is carried round sprocket wheels 5 and 6 at opposite ends of the machine. One of these wheels 5 is a driving sprocket and the bearing of the other 6 is endwise adjustable that the chain may be tightened.

The upper length of this chain 2 runs in a channel bar 7 by which the chain is supported against downward flexure. This bar 7 is supported on cross members 8 between the frames 9 of the machine.

At the entering end of the machine the body of the fish is maintained with the longer axis of its medial section upright, between two parallel sheet metal strips 18, one on each side of the chain. The leading ends of these strips are outwardly and backwardly turned and are mounted on pins 19 projecting from standards 16, one on each side of the chain. The apertures in the strips are elongated to permit the free flexure of the strips in accommodating themselves to variation in the width of the fish. The other ends of these bars 18 are pin-connected to the ends of rocking levers 20 secured on the lower ends of vertically disposed rocking shafts 21. These rocking shafts 21 are connected to move together by arms 22 secured to their upper ends and pin-connected together at 23. The strips 18 are normally retained at the inner limit of their movement by a spring 24 connected between the free ends of other rocking arms 25 secured to the upper ends of the same rocking shaft.

The knife 12, by which the splitting is effected, is secured across the angle on an L-shaped member 10, 11, the point of the knife being secured in any suitable manner to the forwardly directed end of the horizontal component 10, which is split to receive it, and the shank of the blade is passed through a slot in the vertical component 11 and is secured by a set screw 13.

The knife is thus supported with its cutting edge directed upward and toward the line of approach of the fish at an angle of approximately thirty degrees (30°) from the horizontal.

The knife holding L-frame 10, 11 is carried on parallel links 14, 15, from upright standards 16 adjacent the entering end of the machine, the link 14 being pin-connected to the member 11 of the knife frame and to the upright 16 and the link 15 pin-connected to the upper end of 11 and to the upper end of the standards 16 by passing the end of the link 15 through an enlarged aperture in the standard, and providing a collar 17 on each side secured by a set screw.

A spring is interposed between the inner collar 17 and the standard, the reason for which will be explained later.

The knife holding L-frame 10, 11 is supported at the required height above the chain to enter the visceral cavity of the fish by a collar 26 on a stem 27 secured to and projecting upward from the frame 9 of the machine to engage the underside of the link 14 through which it passes and retains a spring 28 between it and a nut threaded on the end of the stem.

Thus, as a fish in the notches 4 of the chain 2, 3 passes in the direction of the arrow between the strips 18, those strips yield outward to accommodate the width of the fish and the leading end of the knife passes into the visceral cavity, where the head has been removed, and while the fish is held down on the chain by the lower member 10 of the L-frame the skin of the belly is stretched upward and rides the edge of the knife 12 and is thereby cut from within outward, while in the stretched position exactly in the medial line.

This manner of splitting the fish with a knife fixed in relation to the fish and by stretching the sides of the visceral cavity against the resistance of the back-bone constitutes an important feature of the invention.

On referring to Fig. 1 where this knife frame is clearly shown, it will be noted that the forwardly directed end of the horizontal member 10 is elevated above the end where it joins the vertical member 11. The object of this is to ensure that the point of the knife does not catch on the end of the backbone where the head has been removed, and yet it is required that the member 10 bear tightly against and the knife cut against the resistance of the backbone. This result is attained by the end movement and spring between the inner collar 17 of the link rod 15 and the standard 16 for the resistance of the fish against the knife will tend to move the frame in the direction of movement of the fish, pivoting about the connection of the link 14 to the knife frame 11, and that turning moment will bring the leading end of 10 and the point of the knife down into contact with the backbone of the fish.

The next operation through which the chain carries the fish is that of removing the viscera. Through this operation the fish is, as in the preceding operation, laterally supported on the chain by side strips 18, but both ends of the strips are carried on rocker arms 20 such as are used for the latter end only in the splitting operation. Provision is also made as before, for normally holding the strips at the inner limit of their movement, and for moving the strips simultaneously outward from the middle line. The viscera are removed by two pair of gutting wheels 38, each pair secured on a shaft 37 to be one on each side of a medial bar 30 by which the fish is firmly held down in the notches 4 of the conveyor chain.

The shafts 37, on which the gutting wheels are secured, are rotatable, each in the free end of an arm 36 which is radially movable about a shaft 42 rotatable in the frame of the machine and driven in a manner to be described later from the first motion shaft of the machine. It drives the shaft 37 by an endless chain 40 over sprocket wheels 38 secured on the shafts 42 and 37.

It is necessary, in order to accommodate variation in the depth of the fish, that the ends of the medial bar 30 should be able to rise and fall independent of one another. It is also necessary that the bar 30 and gutting wheels 38 should be connected to rise and fall together, that the wheels, which run in contact with the flesh, which varies in softness, may be sustained by the bar 30 resting on the backbone. This adaptable, cooperative movement is attained by suspending each end of the medial bar 30 by a rod 31 from an overhead bar 32, the midlength of which is connected to one end of a counterweight lever 44 which is pivoted at 45 to an overhead supporting frame 46, and by connecting the free end of the radial arm 36 which carries the gutting wheels, by a rod 43 to the same bar. The medial bar 30 and the gutting wheels adjacent that end of the bar may thus rise and fall together.

Each suspension rod 31 (see Fig. 7) is connected to the bar 32 by means of a shouldered stud 33 which is connected to the bar that the stud is free to swivel. Through this stud 33 the rod 31 passes and is secured at any desired position of adjustment by a set screw 34. Adjacent the bar 32 the sides of the stud 33 are flattened to pass through an elongated aperture 47 in a member 35, the ends of which are outwardly turned and apertured to form a guide for the suspension rods 31.

Similarly, the suspension rod 43 of the gutting wheel arm 36 is connected to the bar 32 by a member 48 swivel-mounted in the bar, in which member the rod 43 is adjustably secured by nuts.

The underside of the medial bar 30 has portions 49 removed before or behind each gutting wheel, (see Fig. 1), which form pockets in the immediate vicinity to receive any material scraped by the outer edges of the wheels, while the fish is passing under them, and as soon as the fish has passed the material drops from the pockets.

The next operation is that of scraping the inside of the fish along the line of the backbone. In this operation the sides of the fish are supported, as in the preceding operation, by sheet metal strips 18. The sides of the split fish are held open by a mould bar 50, (see Fig. 8), and through apertures in the bottom of this mould bar the lower edges of two scraping wheels 51 project. The bar 50 and the scraping wheel 51 are mounted and connected to move together in the same manner as the medial bar and gutting wheels of the previous operation. The wheels 51 are merely flat discs, the edges of which are in cross section rounded slightly and have V-shaped ridges across the outer edge only.

The final operation is that of scrubbing, which operation is performed by a circular brush 52 rotatably mounted in the free end of a radial arm 36, as in the previous operations of gutting and scraping, and counter-weighted by direct connection to a counter-weight lever.

Between the lower edge of the horizontal member 10 of the knife frame and the lower edge of the medial bar 30 of the gutting wheel is a tongue 53 pivotally connected to the after end of 10 and normally hanging downward with its point just clear of the chain 2, 3. This tongue 53 is lifted by the body of the fish as it passes under it and bridges the space between the after end of the L-frame of the splitting operation and the leading end of the medial bar 30 of the next operation of gutting. Similarly a tongue 54 is connected to the after end of the medial bar 30 and bridges the space between it and the leading end of the mould bar 50.

The several parts of the machine may be driven in any convenient manner, but are preferably driven as illustrated in Fig. 10. As therein shown the driving sprocket 5 of the conveyor chain is secured on the first motion shaft 55 of the machine which may be driven by a belt from any convenient source of power around the pulley 56 secured on the shaft. Around a sprocket 57 secured on the end of this shaft 55 passes an endless chain 58, the upper or tight side of which engages sprocket wheels 59 of the shafts 42 on which the several radial arms 36 are mounted which carry the gutting wheels, the scraping wheels and the cleaning brush.

It will be noticed that the chain 58 passes under the sprocket wheel 59 which drives the brush 52, while it engages the upper sides of those sprockets 59 which operate the gutting and scraping wheels, as the brush is rotated with the movement of the fish on the chain while the gutting and scraping wheels rotate against the movement of the fish. This, however, is not a material point.

A tightener 60 may be applied to the chain 58 between the sprocket wheels of the scrubbing and scraping operations to hold the chain in effective engagement with the wheels.

A plentiful supply of water is supplied through the pipes 61 judiciously positioned in regard to the several operations.

The essential features to which attention is particularly drawn are:

The conveyor chain with the V notched upward projections. The V form provides for variation in the cross section dimension of the fish and affords a strong resisting hold to draw the fish through the several operations.

The stationary cutting knife and its frame, adapted to penetrate the visceral cavity and split the fish from within outward against the resistance of the backbone, upon which the lower member of the knife supporting frame bears.

The side strips supporting the fish on the chain and adaptable to variations in the width to and from the normal minimum limit.

The gutting wheels in combination with the medial bar by which the wheels are supported from the backbone of the fish.

And the wheels for scraping the backbone while supported by the larger arc of the mould bar on the flesh of the fish.

Having now particularly described my invention, I hereby declare that what I claim as new and desire to be protected in by Letters Patent, is:

1. In a fish cleaning machine, means for carrying the fish past the several cleaning operations, said means comprising an endless conveyor chain the links of which have transverse upward projections forming V notches in which the body of the fish is placed with the back down.

2. In a fish cleaning machine, means for carrying the fish past the several cleaning operations, said means comprising an endless conveyor chain the links of which have transverse upward projections forming V notches in which the body of the fish is placed with the back down, the sides of the V notches being tapered backward away from the medial plane through the angle of the V.

3. In a fish cleaning machine, means for supporting the fish and carrying them past the several cleaning operations, said means comprising an endless chain the links of which have transverse upward projections which are V notched to receive the back of the fish, sprocket wheels supporting the chain at each end and through one of which it is driven, and a channel bar in which the tight side of the chain is supported.

4. In a fish cleaning machine, means for splitting the fish from which the head has been removed, said means including a knife, the point of which is directed into the visceral cavity of the fish and means for effecting relative movement between the fish and the knife whereby said splitting is effected from within the visceral cavity outward against the resistance of the backbone.

5. In a fish cleaning operation, means for splitting the fish from which the head has been removed, said means comprising a relatively fixed knife, means for moving the fish with the head end forward and the belly up under said relatively fixed knife, the point of which is directed into the visceral cavity of the fish in the conveyor and the cutting edge of which knife is angled up therefrom to above the upper side of the fish, and means for holding the fish down on the conveyor.

6. In a fish cleaning machine, the combination with a conveyor chain on which the fish with the head removed is placed back down and with the head end directed forward, means for splitting the fish, said means comprising a knife, the cutting edge of which is angled upward and forward from a position adjacent the backbone of the fish, and means for holding the fish down on the chain while the belly tightens on the angled edge of the knife, and means permitting the knife to rise and fall in adapting itself to various sizes of fish.

7. In a fish cleaning machine, the combination with a conveyor chain on which the fish with the head removed is placed back down and with the head end directed forward, means for splitting the fish, said means comprising a knife, the cutting edge of which is angled upward and forward from a position adjacent the backbone of the fish, means for holding the fish down on the chain while the belly tightens on the angled edge of the knife, means permitting the knife to rise and fall in adapting itself to various sizes of fish, and means whereby the resistance of cutting forces the point of the knife downward on the backbone of the fish.

8. In a fish cleaning machine, the combination with a conveyor chain on which the fish with the head removed is placed back down and with the head end directed forward, means for splitting the fish, said means comprising an L-shaped frame supported in the medial plane of a fish on the chain the horizontal component of which frame is directed toward the line of approach of the fish, the extreme end of which L-frame is split to receive the point of the knife, the other end of which knife blade is inserted in a slot in the upright component of the L-frame and adjustably secured thereon, means for supporting the L-frame on the free ends of two parallel links, the other ends of which links are connected toward the line of approach to pivotally move, means for normally supporting the knife frame at a definite position in relation to the chain, means resisting upward movement from that stop, means for supporting the sides of the fish adjacent the knife, and means automatically adapting the side supports to the width of the fish.

9. In a fish cleaning machine, the combination with the conveyor chain on which the fish are carried through the several operations of cleaning, of means for supporting the fish on the conveyor chain with the belly up, said means comprising a strip of thin sheet metal on each side of the chain, means for yieldingly supporting the strips, and means for connecting the strips of the opposite sides that they mutually move from and to the chain in accommodating variation in the thickness of the fish.

10. In a fish cleaning machine, the combination with the conveyor chain on which the fish are carried through the several operations of cleaning, of means for laterally supporting the fish with the belly up on the chain, said means comprising a strip of thin sheet metal along each side of the chain, the ends of which strip are connected to the free ends of arms secured on vertically disposed rocking shafts, the upper ends of which shafts on opposite sides are connected to move together to carry the supporting strips to and from the medial line of the chain, and means for normally holding the strips at the inner limit of their movement.

11. In a fish cleaning machine, the combination with a chain on which the fish are carried through the several operations of splitting and cleaning, of means for removing the entrails of the split fish, of two gutting wheels secured a short distance apart on the same shaft, the outer surfaces of which wheels conform approximately to the inner sides of the visceral cavity and are radially ridged, means for supporting said wheels from the backbone of a fish on the chain that they may rise and fall with variation in the size of the fish, and means for rotating said wheels.

12. In a fish cleaning machine, the combination with a chain on which the fish are carried through the several operations of splitting and cleaning, of means for removing the entrails from the split fish, said means comprising a medial bar yieldably supported parallel to the path of the conveyor with its underside at approximately the upper side of the backbone of a split fish, of a radially ridged gutting wheel secured on a shaft to rotate one on each side of the medial bar with their undersides adjacent the underside of the medial bar, means for connecting the gutting wheels to rise and fall with the bar to which they are related.

13. In a fish cleaning machine, the combination with the chain by which the fish are carried through the several operations of splitting and cleaning, of means for scraping the visceral cavity along the backbone, said means comprising a disc wheel having serrations across its outer edge mounted to rotate in the medial plane of a fish on the chain, means for supporting the scraping wheel from the body of the fish, said means comprising a mould bar generally conforming in cross section to that of the visceral cavity of the fish through an aperture in which mould bar the underside of the wheel slightly projects, and means for connecting the mould bar to the scraping wheel that they may rise and fall together in adapting themselves to the varying depths of fish.

14. In a fish cleaning machine, the combination with a means for supporting and endwise carrying the fish through the several operations of cleaning, means for gutting the fish, said means comprising a medial bar extending lengthwise of the conveying means, a second parallel bar above the medial bar, means for adjustably connecting each end of the medial bar to the second over bar by a pin-connection that will permit either end of the connected bars to be lifted independent of the other end, a lever pivotally mounted on an upper frame, said lever carrying a counterweight at one end and connected at the other end to the midlength of the over bar, a radius arm mounted adjacent each end of the medial bar to move about the shaft on which it is mounted, a pair of gutting wheels secured one on each side of the medial bar on a shaft rotatably mounted in the free end of the radius arm, means for adjustably connecting the free end of each radius arm to the over bar by a pin-connection that will connect the gutting wheels to the medial bar with the underside of each wheel coinciding with the underside of the bar, and that will permit the bar and wheels to rise and fall together at one end independent of the other end, and means for rotating the gutting wheels.

15. In a fish cleaning machine, the combination with a means for supporting and endwise carrying the fish through the several operations of cleaning, means for scraping the backbone of the fish in the visceral cavity, said means comprising a mould bar the cross section of which is adapted approximately to that of the visceral cavity of the fish after splitting, a second bar parallel and above the mould bar, means for adjustably connecting each end of said mould bar to the corresponding end of the second over bar by a pin-connection that will permit either end of the connected bars to be lifted independent of the other end, a lever pivotally mounted on the upper part of the same, said lever carrying a counterweight adjacent one end and pivotally connected at the other end to the midlength of the over bar, a radius arm mounted adjacent each end of the mould bar to move about the shaft on which it is mounted, a scraping wheel having a serrated rim rotatably mounted in the free end of each radius arm, and means for adjustably connecting the free end of each radius arm to the over bar by a pin-connection that will project the underside of the scraping wheel through an aperture in the mould bar and that will permit the scraping wheel and bar of either end to rise and fall together independent of those of the other end.

In testimony whereof I affix my signature.

JOHN KELLINGTON.